United States Patent
Ponsford et al.

(10) Patent No.: US 8,146,059 B2
(45) Date of Patent: Mar. 27, 2012

(54) FEEDING TEST METRICS INTO AN INTEGRATED DEVELOPMENT ENVIRONMENT TO AID SOFTWARE DEVELOPERS TO IMPROVE CODE QUALITY

(75) Inventors: Matthew James Ponsford, Sydney (AU); William John Izard, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 11/954,996

(22) Filed: Dec. 12, 2007

(65) Prior Publication Data

US 2009/0158256 A1  Jun. 18, 2009

(51) Int. Cl.
*G06F 9/44* (2006.01)

(52) U.S. Cl. ........................................ 717/124

(58) Field of Classification Search .................. None
See application file for complete search history.

(56) References Cited

U.S. PATENT DOCUMENTS

| | | | |
|---|---|---|---|
| 6,026,233 A | 2/2000 | Shulman et al. | |
| 2003/0188298 A1* | 10/2003 | Shaposhnick | 717/141 |
| 2005/0120334 A1* | 6/2005 | Deboer | 717/120 |
| 2007/0044075 A1* | 2/2007 | Koning et al. | 717/122 |
| 2007/0168909 A1 | 7/2007 | Vaidyanathan et al. | |
| 2008/0040671 A1* | 2/2008 | Reed | 715/738 |

FOREIGN PATENT DOCUMENTS

WO  WO 2007/068527  6/2007

\* cited by examiner

*Primary Examiner* — Philip Wang
(74) *Attorney, Agent, or Firm* — DeLizio Gilliam, PLLC

(57) ABSTRACT

An IDE or program operable with an IDE retrieves automated test results for a code sequence. The IDE or separate program detects the code sequence during source code development in an IDE. The test results are then presented in the IDE during source code development.

18 Claims, 4 Drawing Sheets

US 8,146,059 B2

FEEDING TEST METRICS INTO AN INTEGRATED DEVELOPMENT ENVIRONMENT TO AID SOFTWARE DEVELOPERS TO IMPROVE CODE QUALITY

FIELD OF THE INVENTION

The invention relates to the field of computer code development and more particularly to a method, apparatus and program product for feeding test metrics into an Integrated Development Environment to aid software developers to improve code quality.

BACKGROUND

Software developers are constantly looking for ways to improve code quality. Code quality measures how well the code is designed and well the code conforms to that design. Code quality encompasses a wide range of qualities, such as usability, reliability, maintainability, scalability and performance. Code performance means the time it takes to execute the code under a given scenario (e.g. on given hardware, with a given number of concurrent users running specified tasks). Code quality can be measured through automated unit tests, which may be run at build time to determine the quality of a unit of code. The output of these automated tests may be a set of html or xml pages detailing passed/failed status of various tests, the performance of certain functions calls (e.g., performance time under a given scenario). A developer can manually reference these tests for use in improving future code quality. However, this is currently a manual process. The improvement in the quality of future code depends upon the developer expending the time to review the automated test results and the developer's ability to effectively interpret the test results and implement improvements.

Integrated development environments (IDEs) are known for aiding software developers to create code. These IDEs perform functions such as providing an icon or list of one or more potentially fitting source code elements based on probability. However, determining the suitability of suggested code elements relies upon the expertise of the developer.

SUMMARY

A method, apparatus and program product for using test results to improve code quality are provided. An IDE or program operable with an IDE retrieves automated test results for a code sequence. The IDE or separate program detects the code sequence during source code development in an IDE. The test results are then presented in the IDE during source code development.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

The present invention provides a method, apparatus and program product for using test results to improve code quality.

Figure 1:
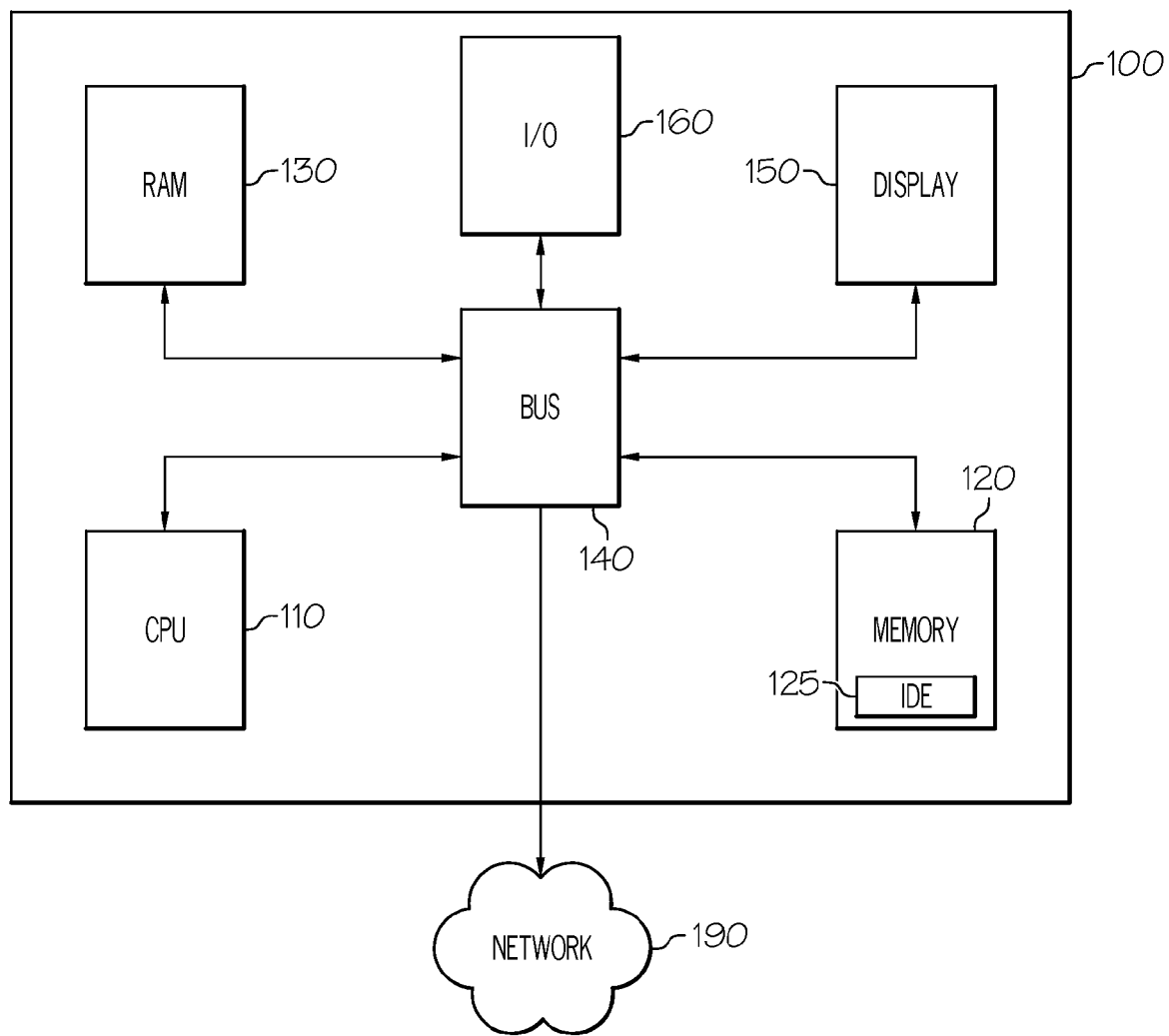
FIG. 1 is a block diagram of a computing device configured to feed test metrics into an Integrated Development Environment according to an exemplary embodiment of the present invention.

In an exemplary embodiment of the present invention, a computing apparatus 100 is provided for using automated software test results to improve code quality. As shown in FIG. 1, the computing apparatus comprises a central processing unit 110 interconnected with a memory 120 and a random access memory (RAM) 130 through a data bus 140. The CPU 110 may also be interconnected to a display 150 and various input/output devices 160 such as a mouse, keypad, printer or the like through bus 140. One or more networks 190, such as the Internet, an intranet, a local area network (LAN), a wide area network (WAN) and the like may be interconnected to the computing device 100 through the bus 140.

An Integrated Development Environment (IDE) 125 is stored on memory 125, which may be an internal or external hard drive, a disc drive, a USB memory device, or any other memory device suitable for storing program code in an accessible manner. The IDE comprises program code that creates a user interface display useful for software developers during the building of code.

The IDE 125 may be a specialized IDE embodying the advantages of the present invention, or alternatively, a separate program may work with an IDE to achieve the advantages of the invention. The IDE 25 (or a supporting separate program) retrieves results from automated testing. These automated tests, which are known in the art, can be run during the automated source code development process or during testing of completed units of code.

The automated test results may provide a range of quality metrics: from pass/fail indicating whether or not the code sequence passed the automated tests (this may include whether or not the code sequence met an established performance criteria, whether the code sequence actually delivered all the function it is meant to deliver, etc.); to quality metrics such as how long the code sequence takes to execute under a given scenario (performance); or warnings of poor code style, which might be generated using, for example, a static code analysis tool. The automated test results might additionally or alternatively provide metrics measuring other code characteristics such as code complexity, maintainability, and the like. These quality metrics may be in the form of warnings as appropriate or as measurement data. The IDE 125 or a program supporting the IDE collects metrics from the test results, and displays those metrics during source code development to aid the code developer to improve code quality.

Figure 2:
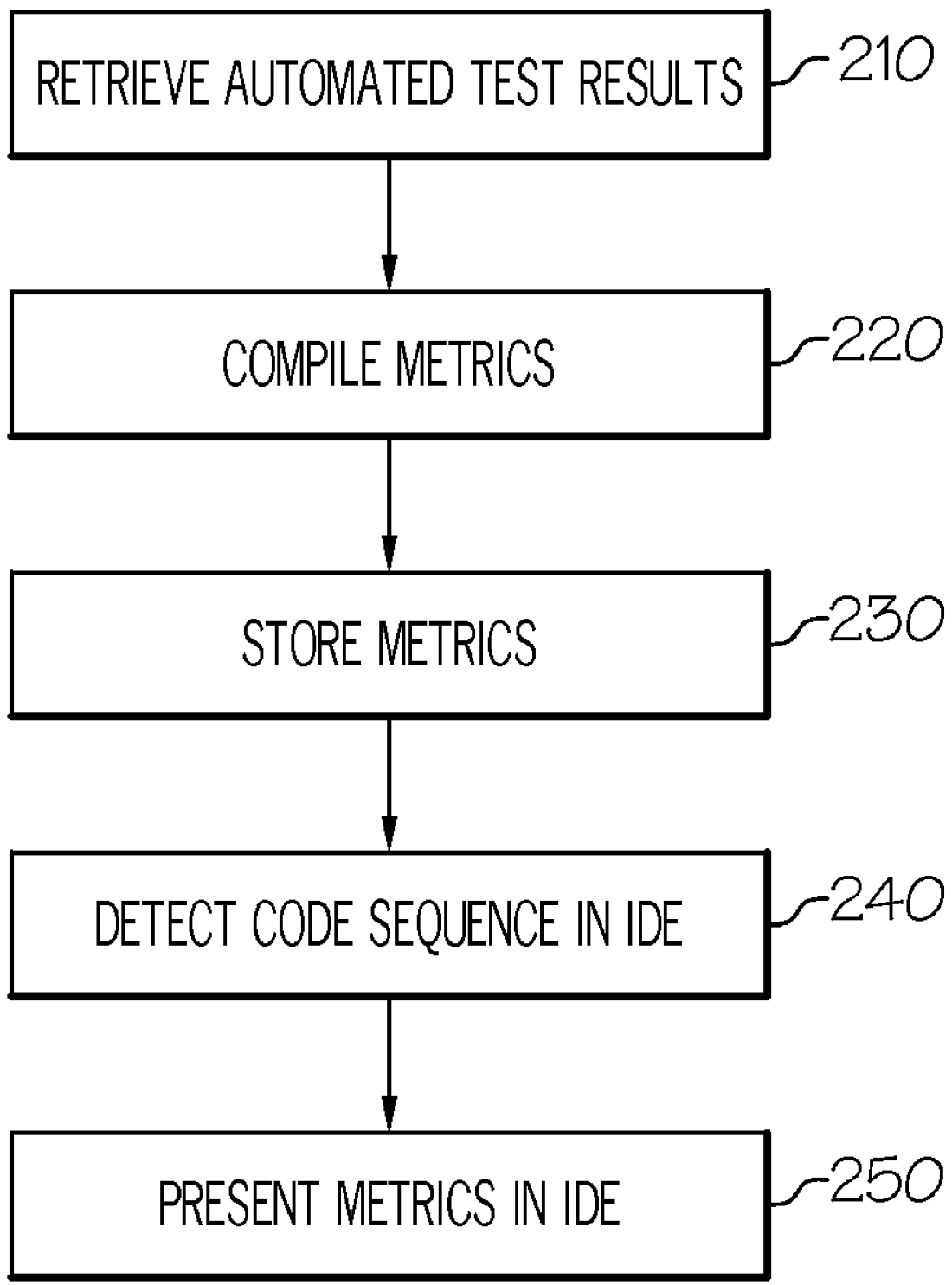
FIG. 2 is a flow diagram of method for feeding test metrics into a software development environment to aid software developers to improve code quality according to an exemplary embodiment of the present invention.

An exemplary method for using test results to improve code quality is shown in FIG. 2. In the illustrated method, the IDE 125 retrieves automated test results (step 210). Typically, the software is built and then deployed onto a system where it will run. The automated tests are also built and deployed on the system, and run against the software. The automated test framework records the pass/failure of each unit test, and the time it took to execute the unit test, which is the performance of the particular part of the software tested by the unit test. Unit tests often test one particular function (e.g. a java method), thus it can be said that the unit test is measuring the performance of that particular function. The unit test will publish the results of the unit tests. It is these results that are retrieved or fed back into the IDE 125. The IDE 125 may retrieve these results, for example, by requesting the published results. Alternatively a separate program may request the results and feed them into the IDE. Then, when a developer attempts to use a particular function (e.g. a java method) for which automated test results have been published, he/she can see the results of the unit test for that function.

Metrics are then compiled from the test results (step 220). As discussed above, the metrics in one exemplary embodiment include pass/fail information, indicating whether or not a particular code sequence passed a particular unit test. This information is valuable during code development to avoid known problems, and thereby improve code quality. In another exemplary embodiment, an automated unit test measures performance of a code sequence, and the metric that is compiled is the average execution time for the particular code sequence compared to some benchmark, for example, to determine whether the code sequence is relatively fast or slow. This information enables the code developer to make informed decisions when choosing between alternative code sequences.

The metrics are stored in a memory 120 (step 230). Metrics may be stored by populating a database, for instance. Each code segment tested may be entered into the database with its corresponding test results. Alternatively, the metrics for each tested code sequence may be stored to a data file. The metrics may be stored within the IDE (125), separately within memory 120, in separate memory in computing device 100 or in a separate memory accessible through network 190.

While the developer is building code in the IDE 125, the IDE detects code sequences for which metrics are available (step 240). Code sequences are detected by comparing or matching a written code sequence to a reference code sequence in a metrics database. The matching step may comprise an exact match, a best fit or other available matching routine. Moreover, the matching may comprise a single line of code or larger blocks of code or both.

The IDE 125 presents metrics for the current code sequence while the developer is operating in the IDE 125 (step 250). In an exemplary embodiment, the IDE 125 presents metrics in a dialog box (420 in FIG. 4) as will be described in more detail below. The dialog box may contain, for example, performance characteristics such as processing time for a function call. The dialog box may also contain test status, such as whether or not the code sequence selected has been subjected to automated testing, whether or not the code sequence has passed automated testing, the percentage of a selected code sequence that has passed automated testing, and other test related information.

In another exemplary embodiment, the IDE 125 presents metrics by changing the appearance of the code sequence. For example, a code sequence may appear in a different color in an editing window of the IDE 125 depending upon the test status of the particular code sequence. A code sequence that has been tested and has passed automated testing, for example, may appear in green. A code sequence that has not been tested, or contains elements that have not been tested, may appear in yellow. A code sequence that has failed automated testing or contains elements that have failed automated testing may appear in red. Similarly, code sequences that have passed automated testing may appear normally, while code sequences that have not been tested or have failed testing may appear in bold, italics, different fonts, etc. In an exemplary embodiment, specific lines of code may be altered in appearance based on test status.

Alternatively, code sequences may appear differently depending upon performance in automated testing. For example, a function call that takes less than 10 milliseconds (ms) to perform may appear in green, while a function call that takes between 10 ms and 100 ms appears in yellow and a function call that takes more than 100 ms appears in red. It should be understood that these thresholds are exemplary and any thresholds, as well as any number of thresholds may be used. Moreover, the thresholds may be set and controlled by a developer or administrator. As another example, two different code sequences for performing a similar function, such as finding an object by 'path' or by 'id' may both undergo unit testing and the relatively faster code sequence would appear in green and the relatively slower code sequence would appear in red. Also, the appearance variations may vary from the foregoing examples. For example, instead of the actual code sequence appearing in various colors, a background or border may change in appearance to indicate automated testing results for a particular code sequence.

Other performance attributes, such as warnings may also be presented either in a dialog box or by changes in appearance of the code. Moreover, the metrics which are presented may be selected, changed and controlled by a code developer or administrator.

Figure 3:
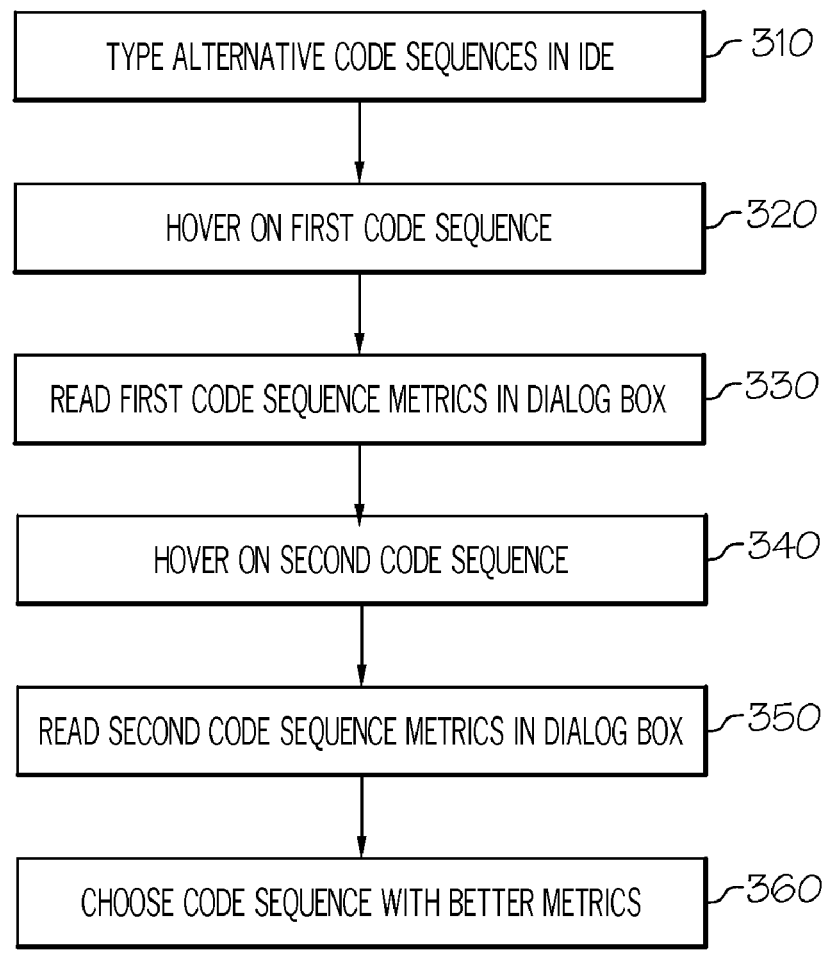
FIG. 3 is a flow diagram of a method for writing improved quality code using metrics in an IDE according to an exemplary embodiment of the present invention.

FIG. 3 shows a flow diagram of a method for writing improved quality code using metrics in a software development environment according to an exemplary embodiment of the present invention. A code developer builds code within an integrated development environment (IDE) 125 which provides various functions to aid the developer in the code development. The IDE 125 provides a display at a user interface which includes a window or graphical representation of code as it is written. In many instances during code development a developer may know two or more ways to perform a particular task. In the exemplary embodiment illustrated in FIG. 3, the developer types two or more alternative code sequences in the IDE 125 (step 310).

Next, the developer selects a first one of the alternative code sequences (step 320). The developer may select one of the alternative code sequences by hovering over the selected code sequence with a mouse or other I/O device, for example. Alternatively, the developer may click on the selected code sequence. It should be understood that any method for selection known in the art is encompassed within the invention.

In response to the selection of one of the alternative code sequences, the IDE 125 presents metrics from automated testing previously performed on the selected code sequence. In an exemplary embodiment, these metrics are presented in a dialog box, and are written in plain English, for example, "average execution time=10 ms". Any combination or variation of metrics may be presented for a selected code sequence. The developer reads the metrics for the selected first code sequence (step 330).

The developer then selects a second code sequence (step 340). Again, the developer may select the second code sequence by hovering over it with an I/O device, such as a mouse, or by any other convenient selection method. As with the first selected code sequence, the SD 125 presents metrics for the second selected code sequence in a dialog box. Then, the developer reads the metrics for the second code sequence in the dialog box (step 350).

Having read each metrics on each alternative code sequence, the developer then chooses the code sequence with better metrics (step 360). Thus, the developer can easily access metrics from automated testing for alternative code sequences while building code and choose the code sequence that has been demonstrated to provide higher code quality. This enables the developer to select code sequences with faster processing time, code sequences that have passed automated testing, code sequences that have fewer warnings, etc.

The foregoing flow is an example flow of how the IDE might present the test results for a code sequence, by hovering on typed code. Other mechanisms may also be used for presenting test results in an IDE during source code development. For example, some IDEs offer an 'outline' view of each ode unit, which lists all of the functions available in that code unit. A user (developer) could select each function in the outline view to view the metrics for that function. Also, if an IDE offers an 'autocomplete' mechanism, which offers a similar outline list of available functions, this view may be extended to show metrics for available code.

Figure 4:
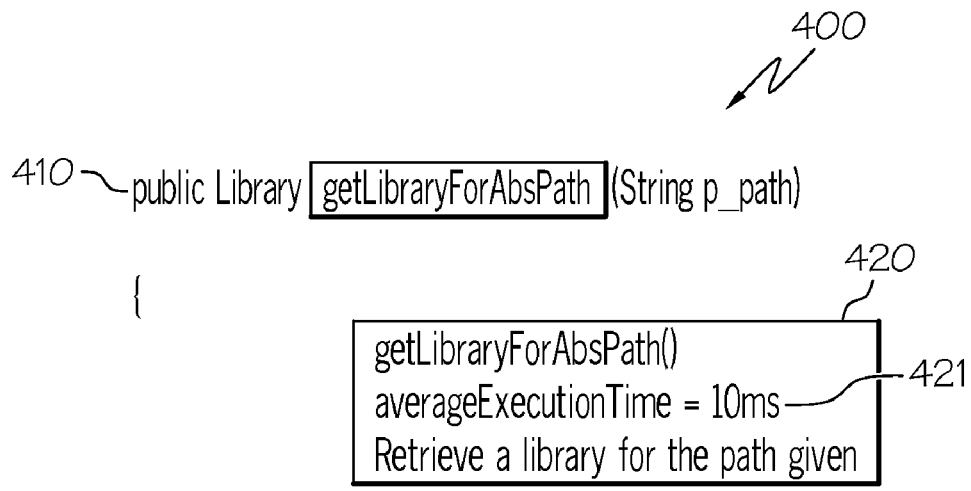
FIG. 4 is a visual representation of a view for presenting performance metrics for code sequences in an IDE when a user hovers over a method name according to an exemplary embodiment of the present invention.

FIG. 4 illustrates an example of the foregoing process. During software development, a developer knows two methods to perform a similar function. In the illustrated example, the developer has an object (content) and wants to get the library that the content is in. The developer knows two ways to find the library, both involve using a 'LibraryService', which is a service that can be used for getting libraries associated with objects, such as content. The developer can use the path of the content, which is known to the developer. Alternatively, the developer can use the id of the content, which is known to the developer. Either can be used to find the associated library.

In the illustrated instance the developer can either find the library by its path or by its id. One method, however, may perform significantly better than the other. In this example, looking up the library by path might involve a simple string manipulation and cache lookup, which will require very little processing time. Meanwhile, looking up the library by id might involve a query to a database, will require much more processing time.

The developer types lines of code for each way to find the associated library:

Library
    library=libraryService.getLibraryForContentId
    (id)    (1)

Library
    library=libraryService.getLibraryForContentPath
    (path)    (2)

These lines of code are displayed on a screen 400 of a graphical user interface (e.g., display 150) in the IDE 125.

In an alternative embodiment, the developer does not actually type two alternate lines of code. Instead, the developer may use a feature of the IDE 125 to select a function. First, the developer types:

Library library=libraryService.    (3)

Then, the developer uses an 'auto-complete' feature of the IDE 125 (such as ctrl+space in Eclipse™). The 'auto-complete' feature offers (presents) all of the functions available on the libraryService in a list. The user will view the functions: 'getLibraryForContentId( )' and 'getLibraryForContentPath( )' as potential functions on the list. The developer might hover over each function in the list to view the performance metrics for that function. Alternatively, the list of functions might be presented with metrics for each function. Having reviewed the performance metrics, the developer may select the fastest function. The IDE 125 would then insert the text for the developer, saving typing by the developer.

As shown in FIG. 4, the developer has selected code sequence (2) by hovering on the line of code 410 to find the library using the content path. In response the selection of line of code 410, the IDE 125 opens a dialog box 420. In the dialog box, the IDE presents the performance metrics 421. In the illustrated example the performance metric is average run time, and the average run time for the code sequence using the file path is 10 ms.

Figure 5:
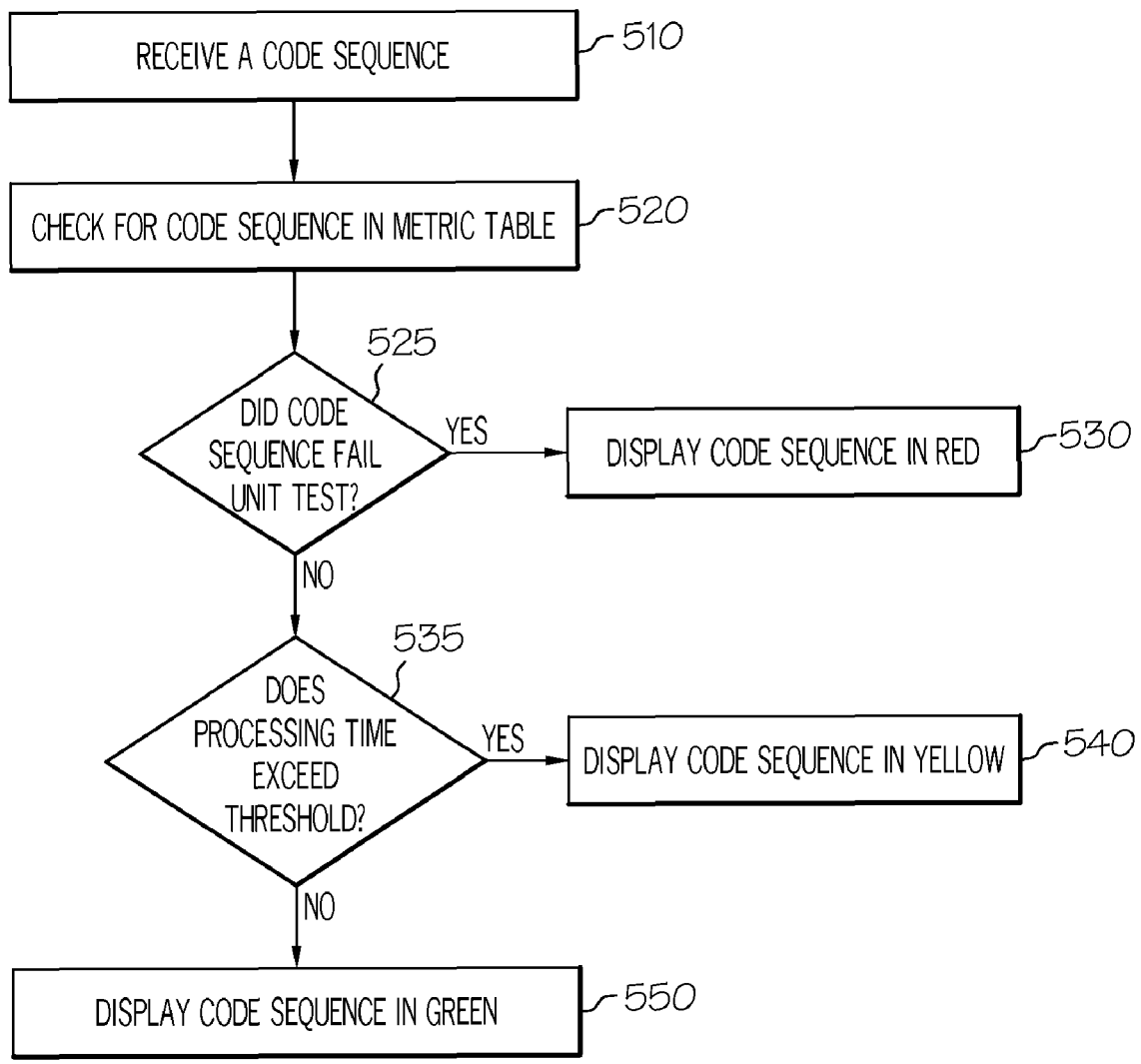
FIG. 5 is flow diagram for a method of presenting software metrics in an IDE according to an exemplary embodiment of the present invention.

FIG. 5 is flow diagram for a method of presenting software metrics in a software development environment according to an exemplary embodiment of the present invention. The IDE 125 receives a code sequence (step 510). This may be accomplished by a developer entering a code sequence into a user interface, whereby the IDE 125 automatically checks for test metrics for each line of code or other code sequence definition. Alternatively this may be accomplished by selecting a code sequence.

The IDE 125 then checks for the entered or selected code sequence in a metrics table (step 520) and retrieves the metrics for the specified code sequence. Alternatively, the IDE may look in a folder or the like. In another embodiment, the IDE 125 may run an automated test during source code development in response to entering or selecting a particular code sequence.

The IDE 125 then determines from the metrics (retrieved either from a table or folder or from running an automated test) for the specified code sequence whether or not the code sequence has failed unit test (step 125). If the code sequence failed testing, then the code sequence is displayed in a manner to indicate that this code sequence should be avoided (step 530). In an exemplary embodiment the failed code sequence is displayed in red type.

The IDE 125 then determines whether a performance threshold is exceeded (step 535). In the illustrated embodiment, the performance threshold is run time. However, the threshold may be for other performance metrics, such as warnings, for example. Also, absence of testing may be used as a performance threshold.

If the metric for the specified code sequence exceeds the threshold, then the code sequence is displayed in a manner indicating that this code sequence should be used with caution or use should be limited. For example, a code sequence which should be used with caution or used sparingly may be displayed in yellow type.

If the metric does not exceed the threshold, then the code sequence is displayed in a manner that indicates that the particular code sequence is good to use. For example, a code sequence that is good to use may be displayed in green type.

It should be understood that while three different display colors are described in the foregoing description, any number of different display types (e.g., colors) may be used to indicate different test results. Also, the metrics can be displayed in different combinations. Moreover, the number, type and combinations of display appearances indicating different metrics may be selected or set by a user/developer or by an administrator.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain, store, communicate, propagate, or transport the program for use by or in connection with the instruction execution system, apparatus, or device.

The foregoing method may be realized by a program product comprising a machine-readable media having a machine-executable program of instructions, which when executed by a machine, such as a computer, performs the steps of the method. This program product may be stored on any of a variety of known machine-readable storage media, including but not limited to compact discs, floppy discs, USB memory devices, and the like. Moreover, the program product may be in the form of a machine readable transmission such as blue ray, HTML, XML, or the like.

The medium can be an electronic, magnetic, optical, electromagnetic, infrared, or semiconductor system (or apparatus or device) or a propagation medium. A propagation medium is distinct from a storage medium. Examples of a computer-readable storage medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-RW) and DVD.

The preceding description and accompanying drawing are intended to be illustrative and not limiting of the invention. The scope of the invention is intended to encompass equivalent variations and configurations to the full extent of the following claims.

What is claimed is:

1. A method for using test results in an integrated development environment, comprising:
    storing quality metrics compiled from automated test results for a plurality of code sequences in association with function names for the plurality of code sequences, wherein the code quality metrics are accessible by the integrated development environment;
    detecting, in a user interface of the integrated development environment, an indication of a code sequence, wherein said detecting the indication of the code sequence is during source code development in the integrated development environment;
    finding multiple of the function names that match the indication of the code sequence, wherein those of the plurality of code sequences associated with the multiple function names perform a same task differently; and
    presenting the quality metrics compiled from the automated test results for those of the plurality of code sequences associated with the multiple of the function names that match the indication of the code sequence.

2. The method of claim 1, wherein the quality metrics are stored in one or more files.

3. The method of claim 1, wherein the quality metrics are stored in a database.

4. The method of claim 1 further comprising:
    presenting the multiple of the function names in the user interface;
    detecting when a cursor is hovered over the multiple of the function names, wherein said presenting the quality metrics for those of the plurality of code sequences associated with the multiple of the function names that match the indication of the code sequence comprises presenting each of the quality metrics in response to detecting when the cursor is hovered over respective ones of the multiple of the function names.

5. The method of claim 4, wherein the quality metrics are presented in a dialog box.

6. The method of claim 4 further comprising:
    inserting, into the source code, a first code sequence of the plurality of code sequences or the one of the references of the first code sequence responsive to selection of the one of the function names that corresponds to the first code sequence; and
    presenting, in the source code, the inserted first code sequence or representation of the first code sequence with a different appearance based upon the quality metric for the first code sequence.

7. The method of claim 6, wherein the different appearance represents one of the quality metric falling below a performance threshold, the quality metric exceeding a performance threshold, the quality metric indicating test failure, and the quality metric indicating test passing.

8. An apparatus for using test results in a software development environment, comprising:
    a processor, and
    a memory interconnected with the processor and having stored thereon a software development environment, the software development environment configured to,
    store quality metrics compiled from automated test results for a plurality of code sequences in association with function names for the plurality of code sequences, wherein the code quality metrics are accessible by the software development environment;
    detect, in a user interface of the software development environment, an indication of a code sequence, wherein the software development environment configured to detect the indication of the code sequence is during source code development in the software development environment;
    find multiple of the function names that match the indication of the code sequence, wherein those of the plurality of code sequences associated with the multiple function names perform a same task differently; and
    present the quality metrics compiled from the automated test results for those of the plurality of code sequences associated with the multiple of the function names that match the indication of the code sequence.

9. The apparatus of claim 8, wherein the software development environment comprises program instructions for the user interface.

10. The apparatus of claim 8, further comprising a file encoded on a memory interconnected with the processor wherein the quality metrics are stored in the file.

11. The apparatus of claim 8, further comprising a database encoded on a memory interconnected with the processor wherein the quality metrics are stored in the database.

12. A computer program product comprising a computer-readable storage medium having encoded thereon computer-executable program instructions for using test results in an integrated development environment, comprising:
    first program instructions for storing quality metrics compiled from automated test results for a plurality of code sequences in association with function names for the plurality of code sequences, wherein the code quality metrics are accessible by the integrated development environment;
    second program instructions for detecting, in a user interface of the integrated development environment, an indication of a code sequence, wherein said detecting the indication of the code sequence is during source code development in the integrated development environment;

third program instructions for finding multiple of the function names that match the indication of the code sequence, wherein those of the plurality of code sequences associated with the multiple function names perform a same task differently; and fourth program instructions for presenting the quality metrics compiled from the automated test results for those of the plurality of code sequences associated with the multiple of the function names that match the indication of the code sequence.

13. The program product of claim 12, further comprising:

fifth program instructions for storing the quality metrics in files with the function names of the plurality of code sequences.

14. The program product of claim 12, further comprising:

fifth program instructions for storing the quality metrics in a database with the function names of the plurality of code sequences.

15. The program product of claim 12 further comprising:

fifth program instructions for presenting the multiple of the function names in the user interface;

sixth program instructions for detecting when a cursor is hovered the multiple of the function names, wherein the fourth program instructions for presenting the quality metrics for those of the plurality of code sequences associated with the multiple of the function names that match the indication of the code sequence comprises the fourth program instructions for presenting each of the quality metrics in response to detecting when the cursor is hovered over respective ones of the multiple of the function names.

16. The program product of claim 15, wherein the quality metrics are presented in a dialog box.

17. The program product of claim 15 further comprising:

seventh program instructions for inserting, into the source code, a first code sequence of the plurality of code sequences or the one of the references of the first code sequence responsive to selection of the one of the function names that corresponds to the first code sequence; and eighth program instructions for presenting, in the source code, the inserted first code sequence or representation of the first code sequence with a different appearances based upon the quality metric for the first code sequence.

18. The program product of claim 17, wherein the different appearance represents one of the quality metric falling below a performance threshold, the quality metric exceeding a performance threshold, the quality metric indicating test failure, and the quality metric indicating test passing.

* * * * *